United States Patent
Byron et al.

(10) Patent No.: US 11,144,869 B2
(45) Date of Patent: Oct. 12, 2021

(54) DEVICES, SYSTEMS, AND METHODS FOR SECURE AND ADAPTABLE TRANSPORTATION OF GOODS AND/OR PERSONS

(71) Applicant: INTERNATIONAL BUSINESS MACHINES CORPORATION, Armonk, NY (US)

(72) Inventors: Donna K. Byron, Petersham, MA (US); Carmine M. DiMascio, West Roxbury, MA (US); Benjamin L. Johnson, Baltimore City, MD (US); Jacquelyn A. Martino, Cold Spring, NY (US); Florian Pinel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 15/721,209

(22) Filed: Sep. 29, 2017

(65) Prior Publication Data

US 2019/0102731 A1    Apr. 4, 2019

(51) Int. Cl.
G06Q 10/08    (2012.01)
H04W 12/06    (2021.01)
(Continued)

(52) U.S. Cl.
CPC ..... G06Q 10/0833 (2013.01); *G06Q 30/0635* (2013.01); *H04W 4/40* (2018.02);
(Continued)

(58) Field of Classification Search
CPC .......... G06Q 10/0833; G06Q 30/0635; H04W 12/00407; H04W 4/40; H04W 12/67; H04W 12/47; H04W 12/06
See application file for complete search history.

(56) References Cited

U.S. PATENT DOCUMENTS 9,244,147 B1    1/2016  Soundararajan et al.
9,336,506 B2    5/2016  Shucker et al.
(Continued)

FOREIGN PATENT DOCUMENTS

GB      2537122 A       12/2016
WO      2016037219 A1    3/2016

OTHER PUBLICATIONS

"Vehicle Routing Problems for Drone Delivery" Published by IEEE transactions on systems, man and cybernetics (Year: 2017).*
(Continued)

*Primary Examiner* — Zeina Elchanti
(74) *Attorney, Agent, or Firm* — Conley Rose, P.C.

(57) ABSTRACT

A method includes receiving, by a first device of a transportation provider, a device ID of a particular device of a user and purchase information regarding a purchase, by the user, of one or more goods or services. The method includes sending, by the first device, the device ID of the particular user device to a central server. The method includes receiving, by the first device from the central server, information regarding the particular user device. The method includes determining, by the first device, a selected transportation vehicle based on the purchase information and the information regarding the particular user device. The method includes sending, by the first device, a vehicle ID of the selected transportation vehicle to the central server. The method includes providing a transportation service to the user using the particular user device and the selected transportation vehicle.

20 Claims, 9 Drawing Sheets

(51) Int. Cl.
  *G06Q 30/06* (2012.01)
  *H04W 4/40* (2018.01)
  *H04W 12/47* (2021.01)
  *H04W 12/67* (2021.01)

(52) U.S. Cl.
  CPC ............ *H04W 12/06* (2013.01); *H04W 12/47* (2021.01); *H04W 12/67* (2021.01)

(56) References Cited

U.S. PATENT DOCUMENTS

| | | |
|---|---|---|
| 9,384,668 B2 | 7/2016 | Raptopoulos et al. |
| 9,523,986 B1 | 12/2016 | Abebe et al. |
| 9,573,684 B2 | 2/2017 | Kimchi et al. |
| 2014/0032034 A1 | 1/2014 | Raptopoulos et al. |
| 2014/0254896 A1 | 9/2014 | Zhou et al. |
| 2015/0120094 A1 | 4/2015 | Kimchi et al. |
| 2015/0158599 A1 | 6/2015 | Sisko |
| 2015/0183528 A1 | 7/2015 | Walsh et al. |
| 2015/0301150 A1* | 10/2015 | Stuckman ............... G01S 1/00 342/407 |
| 2016/0033966 A1 | 2/2016 | Farris et al. |
| 2016/0068264 A1 | 3/2016 | Ganesh et al. |
| 2016/0101874 A1 | 4/2016 | McKinnon et al. |
| 2016/0159496 A1 | 6/2016 | O'Toole |
| 2016/0232487 A1 | 8/2016 | Yonker |
| 2018/0053139 A1* | 2/2018 | Stoman ............... G05D 1/0676 |
| 2018/0101173 A1* | 4/2018 | Banerjee ............ H04N 5/23248 |
| 2018/0111683 A1* | 4/2018 | Di Benedetto ........ G06Q 30/04 |
| 2018/0203465 A1* | 7/2018 | Suzuki ............... G08G 5/0069 |

OTHER PUBLICATIONS

Heerkens, H.; "Drones"; 10th World Cargo Symposium; Berlin Germany, Mar. 15-17, 2016.

Anonymously; "Secure Item Tracking for a Semi-Autonomous Vehicle Delivery System"; http://ip.com/IPCOM/000247073D; Aug. 2, 2016.

Anonymously; "Guided Landing and Secure Acceptance Delivery Method for Unmanned Package Delivery"; http://ip.com/IPCOM/000243452D; Sep. 22, 2015.

Lamkin, AF. et al.; "Ad Hoc Payment for Unmanned Product Delivery"; http://ip.com/IPCOM/000239066D; Oct. 8, 2014.

List of IBM Patents or Patent Applications Treated as Related, 2 pages, Mar. 2, 2021.

* cited by examiner

DEVICES, SYSTEMS, AND METHODS FOR SECURE AND ADAPTABLE TRANSPORTATION OF GOODS AND/OR PERSONS

BACKGROUND

The present disclosure relates to transportation of goods or persons. Unsecure transportation services may result in delivery of goods to an incorrect recipient, loss of goods, or harm to a person. With new forms of transportation or delivery, a postal address may not sufficiently indicate where pickup and/or drop-off are to take place, and previous delivery or transportation vehicle selection techniques may not be suitable.

SUMMARY

According to an embodiment of the present disclosure, a method includes receiving, by a device of a transportation provider, a device identification (ID) of a particular user device of one or more user devices of a user and purchase information regarding a purchase, by the user, of one or more goods or services that are associated with a transportation service to be provided by the transportation provider. The method includes sending, by the device of the transportation provider, the device ID of the particular user device to a central server. The method includes receiving, by the device of the transportation provider from the central server, information regarding the particular user device. The method includes determining, by the device of the transportation provider, a selected transportation vehicle based on the purchase information and the information regarding the particular user device. The method includes sending, by the device of the transportation provider, a vehicle ID of the selected transportation vehicle to the central server. The method includes providing, by the transportation provider, a transportation service to the user using the particular user device and the selected transportation vehicle.

According to another embodiment of the present disclosure, a method includes receiving, by a central server, purchase information regarding a purchase, by a user, of one or more goods or services that are associated with a transportation service to be provided by the transportation provider. The method includes determining, by the central server, a particular user device of one or more user devices of the user based on selection criteria and based on the purchase information. The method includes requesting that the transportation provider use the particular user device to provide the transportation service by sending, by the central server to the device of the transportation provider, information regarding the particular user device. The method includes receiving, by the central server from the device of the transportation provider, a vehicle ID of a selected transportation vehicle to be used to provide the transportation service and a tracking number associated with the transportation service. The method includes sending, by the central server, the vehicle ID and the tracking number to the particular user device.

According to another embodiment of the present disclosure, a central server includes a memory and a processor coupled to the memory. The processor is configured to receive purchase information regarding a purchase, by a user, of one or more goods or services that are associated with a transportation service to be provided by the transportation provider. The processor is configured to determine a particular user device of one or more user devices of the user based on selection criteria and based on the purchase information. The processor is configured to request that the transportation provider use the particular user device to provide the transportation service by sending, to the device of the transportation provider, information regarding the particular user device. The processor is configured to receive, from the device of the transportation provider, a vehicle ID of a vehicle to be used to provide the transportation service and a tracking number associated with the transportation service. The processor is configured to send the vehicle ID and the tracking number to the particular user device.

DETAILED DESCRIPTION

The devices, systems, and methods in this disclosure provide one or more aspects of secure and/or adaptable transportation of goods and/or persons. For example, a system, device, or method of this disclosure may be used to deliver purchased goods to a user using a selected user device to authenticate delivery and to guide a transportation vehicle to the delivery location. As an example, the user may purchase a product or a meal via an online marketplace or e-commerce website, and a transportation provider may deliver the purchased product or meal to the user using an unmanned vehicle. In this example, the unmanned vehicle may interact with the selected user device to authenticate delivery and to guide the unmanned vehicle to the selected user device for drop-off of the purchased product or meal. As another example, the user may purchase a passenger transportation service (e.g., taxi service), and a transportation provider may provide the passenger transportation service using an unmanned vehicle. In this example, the unmanned vehicle may interact with the particular user device to locate the user to pick the user up and/or to authenticate the user.

The transportation provider may select the transportation vehicle to use and to provide the transportation service based on capabilities of the selected user device as indicated by information received from a central server. Additionally, the particular user device may be selected based on a rule engine so that the user device or delivery method does not need to be selected for every seller or transportation provider. In some embodiments, once dispatched, the selected transportation vehicle does not need connection to a data network to perform transportation service—the transportation vehicle navigates to a general location of the user device using a global positioning system (GPS) and finalizes approaching the user device using near field communication (NFC) capability.

Figure 1:
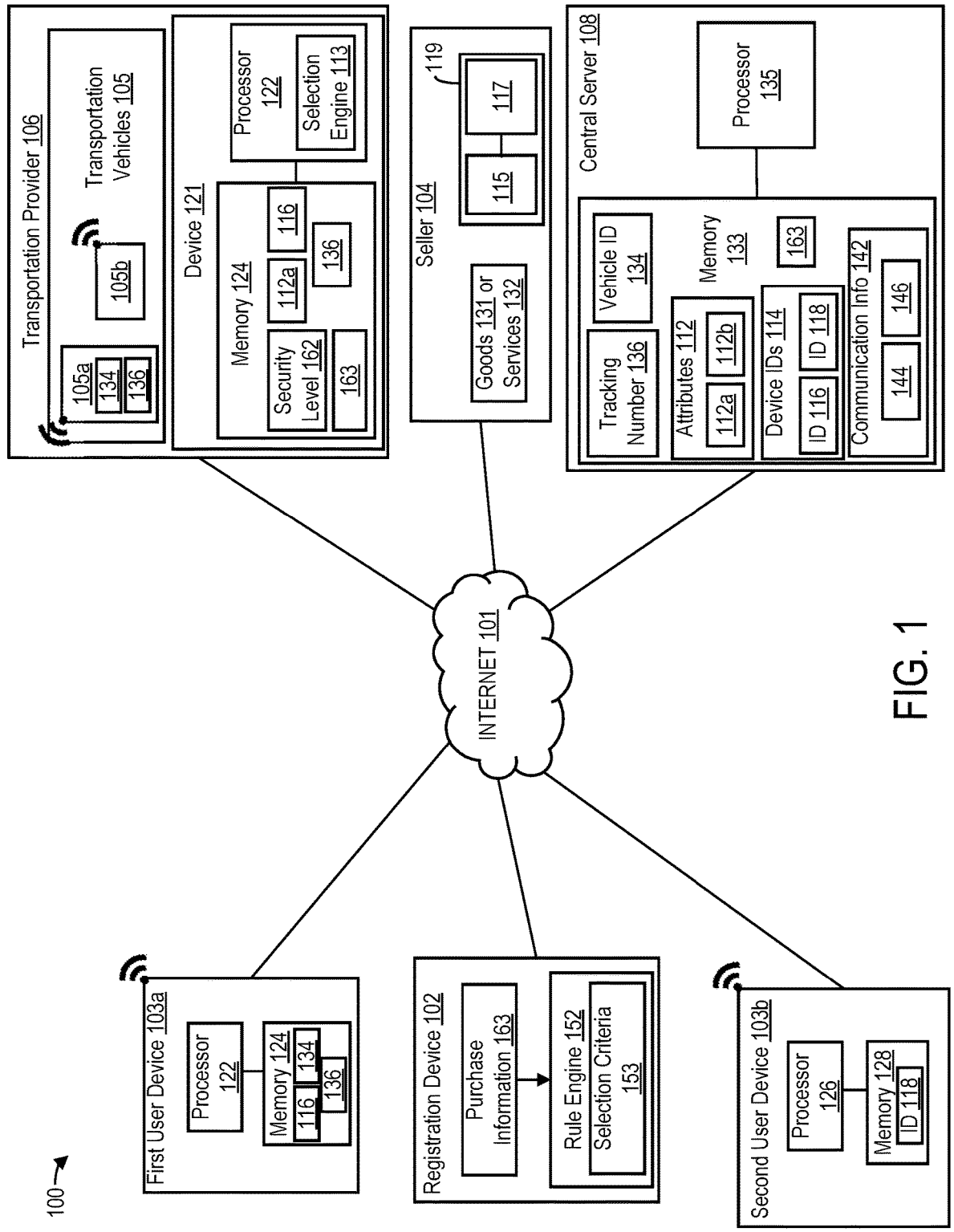
FIG. 1 shows an illustrative block diagram of a system configured to provide secure and/or adaptable transportation of goods or services purchased by a user.

With reference now to FIG. 1, a system 100 configured to provide one or more aspects of secure and/or adaptable transportation service to provide one or more goods 131 or services 132 purchased by a user is illustrated. As an example, the one or more goods 131 may include products or meals. As another example, the one or more services 132 may include passenger transportation services, such as taxi service. The system 100 includes one or more user devices 103, a registration device 102, a device 119 of a seller 104 of the one or more goods 131 or services 132, a transportation provider 106 that includes a device 121 and one or more transportation vehicles 105, and a central server 108 including a processor 135 coupled to a memory 133. The term "user end" as used in this disclosure may refer to the user or a user device, such as the one or more user devices 103, the registration device 102, a device used by the user to purchase the one or more goods 131 or services 132, or a combination thereof.

Embodiments of the disclosure may include one or more entities of the system 100. For example, an embodiment of the disclosure includes the one or more user devices 103 configured to perform operations described herein as being performed by the one or more user devices 103. Another embodiment of the disclosure includes the device 121 configured to perform operations described herein as being performed by the transportation provider 106 or the device 121 of the transportation provider. Another embodiment of the disclosure includes the seller 104 or the device 119 configured to perform operations described herein as being performed by the seller 104 or the device 119 of the seller. Another embodiment of the disclosure includes the central server 108 configured to perform operations described herein as being performed by the central server 108. Another embodiment includes the seller 104 or the device 119 and the transportation provider 106 or the device 121 configured to perform operations described herein as being performed by the seller 104 or the device 119 and/or the transportation provider 106 or the device 121.

The seller 104 may be an online marketplace, such as AMAZON or EBAY, that sells goods or services. The user may access the online marketplace (e.g., a web page or web application of the seller 104) to purchase the one or more goods 131. Alternatively, the seller 104 may be a seller of transportation services, such as UBER. In this example, the user may access a web application of the seller 104 to purchase the one or more services 132 to transport the user from a first location to a second location.

The system 100 includes various devices used to purchase the one or more goods 131 or services 132. In some examples, the registration device 102 is used to purchase the one or more goods 131 or services 132. In other examples, one of the one or more user devices 103 is used to purchase the one or more goods 131 or services 132. Alternatively, one or more other devices owned or used by the user may be used to purchase the one or more goods 131 or services 132.

The registration device 102 is configured to connect to the internet 101 via a wired or wireless connection, such as a wireless local area network ("WLAN"). The user uses the registration device 102 to register the one or more user devices 103 with the central server 108 to an account associated with the user. During registration of the one or more user devices 103 with the central server 108, the user provides, via the registration device 102, the central server 108 with attributes 112 of the one or more user devices 103. For example, the central server 108 may host account information of the user, and the user may use the registration device 102 to connect to the internet 101, access the account page hosted by the central server 108, and log in to the account page hosted by the central server 108. The user may then use the registration device 102 to navigate to an account settings web page associated with the user's account and enter a model number, a manufacturer, a model name, or some other identification information that enables the central server 108 to identify the one or more user devices 103 or capabilities thereof. During registration, the user provides communication information 142 to the central server 108 that enables the central server 108 to send information to the one or more user devices 103. For example, the communication information 142 may correspond to internet protocol (IP) addresses of the one or more user devices 103. The user may navigate to the account settings web page associated with the user's account and enter an IP address associated with each of the one or more user devices 103.

The one or more user devices 103 are candidate devices that may be used during delivery of goods to the user or during provision of transportation services for the user. For example, and as described in more detail below, the one or more user devices 103 may be used to authenticate a transportation vehicle and/or to guide a transportation vehicle to a location during performance of the transportation service. In some examples, the one or more user devices 103 include a drone landing pad, a mobile phone, a beacon within a fenced property, or a combination thereof. Although FIG. 1 illustrates the one or more user devices 103 as distinct from the registration device 102, in some examples, at least one of the one or more user devices 103 may be integrated with the registration device 102 or may be used to perform the registration and/or may be used during performance of the transportation service to perform authentication or guidance.

In the example illustrated in FIG. 1, the one or more user devices 103 include a first user device 103a and a second user device 103b, and the attributes 112 include attributes 112a of the first user device 103a and attributes 112b of the second user device 103b. However, in other examples, the one or more user devices 103 include less than two devices or more than two devices. The first user device 103a includes a processor 122 and a memory 124. The processor 122 is configured to connect to the internet via a wired or wireless connection. For example, the first user device 103a may include a transceiver configured to establish a connection to a wireless local area network (WLAN). The first user device 103a additionally includes a short range communication capability, such as BLUETOOTH. The second user device 103b includes a processor 126 and a memory 128. The processor 126 is configured to connect to the Internet 101 via a wired or wireless connection. For example, the second user device 103b may include a transceiver configured to establish a connection to a wireless local area network (WLAN). The second user device 103b additionally includes a short range communication capability, such as BLUETOOTH.

The user end, the central server 108, or the device 121 of the transportation provider 106 selects a particular user device of the one or more user devices 103 to be used during delivery of the one or more goods 131 or during provision of the one or more services 132. In some examples in which the user end selects the particular user device, the user or a rule engine 152 implemented (e.g., via a processor) on the user end selects the particular user device during purchase of the one or more goods 131 or services 132. In some of these examples, when the transportation provider 106 is distinct from the seller 104, the user end sends the device ID of the particular user device to the device 119 of the seller 104, and the device 119 of the seller 104 sends the device ID to the device 121 of the transportation provider 106. In other examples, the user end sends the device ID of the particular user device to the device 121 of the transportation provider 106.

In some examples in which the user selects the particular user device, the user enters the device ID of the particular user device into a field of a webpage (e.g., of the seller 104) or web application (e.g., of the seller 104) used to purchase the one or more goods 131 or services 132. The device 119 of the seller 104 then sends the device ID to the device 121 of the transportation provider 106. To illustrate, the user may desire to receive delivery of the one or more goods 131 via drone delivery. In this example, the first user device 103a may correspond to a drone landing pad and the user therefore selects the first user device 103a as the particular user device. Using the device used to purchase the one or more goods 131, the user accesses a web page or web application of the seller 104 and proceeds to purchase the one or more goods 131. The web page or web application of the seller 104 may include a field to receive a device ID of a selected device, and the user may enter, via the device used to purchase the one or more goods 131 and the internet 101, the device ID associated with the first user device 103a into the field of a webpage or web application used to purchase the one or more goods 131. The device 119 of the seller 104 obtains the device ID 116 from the associated field and sends (e.g., via the internet 101) the device ID 116 to the device 121 of the transportation provider 106.

In some examples in which the rule engine 152 implemented on the user end selects the particular user device from the one or more user devices 103, the rule engine 152 is configured to select the particular user device based on purchase information 163 regarding the purchase and based on one or more selection criteria 153. The purchase information 163 may indicate the seller 104, may indicate the transportation provider 106, may indicate attributes of the one or more goods 131 or services 132, may indicate a location associated with the user (e.g., a delivery location), or a combination thereof. In some examples, the rule engine 152 is configured to automatically retrieve the purchase information 163 at the time of purchase. For example, the rule engine 152 may be implemented using an application that is installed and runs on the device used to purchase the one or more goods and services. In some of these examples, the application that implements the rule engine 152 is configured to interact with a browser or application used to purchase the one or more goods 131 and services 132, retrieve information from particular fields of a webpage or the application used to purchase the one or more goods 131 or services 132, and determine the purchase information 163 from the retrieved information. The one or more selection criteria 153 may be entered by a user. For example, the rule engine 152 may be implemented using an application that is installed and runs on the device used to purchase the one or more goods 131 and services 132. The application, when installed or opened by the user, may prompt the user to select the one or more selection criteria 153.

In some examples, the one or more selection criteria 153 indicates which of the one or more user devices 103 are available to which seller(s), which of the one or more user devices 103 are available to which transportation provider(s), which of the one or more user devices to use when ordering a particular type of good or service, which of the one or more user devices 103 to use based on location of the user, or a combination thereof. For example, the selection criteria 153 may indicate that the first user device 103a is available to only a first seller. In this example, when the user purchases the one or more goods 131 or services 132 from a second seller, the rule engine 152 is configured to select the second user device 103b as the particular user device based on the selection criteria 153 indicating that the first user device 103a is only available to the first seller. As another example, the selection criteria 153 may indicate that the first user device 103a is available to only a first transportation provider. In this example, when the transportation service is to be provided by a second transportation provider, the rule engine 152 is configured to select the second user device 103b as the particular user device based on the selection criteria 153 indicating that the first user device 103a is only available to the first seller. As another example, the selection criteria 153 may indicate that the first user device 103a is to always be used when the user purchases a first type of good. To illustrate, the first user device 103a may correspond to a cellular phone and the second user device 103b may correspond to a drone landing pad, and the selection criteria 153 may indicate that the cellular phone should always be selected as the particular user device when the one or more goods 131 correspond to a meal or when the one or more services 132 correspond to a meal transportation service. In this example, when the one or more goods 131 or services 132 correspond to a meal or a meal transportation service, the rule engine 152 is configured to select the first user device 103a as the particular user device based on the selection criteria 153 indicating that the first user device 103a should always be selected as the particular user device when the one or more goods 131 or services 132 correspond to a meal or a meal transportation service.

In examples in which the central server 108 selects the particular user device (e.g., the first user device 103a), the rule engine 152 is additionally or alternatively implemented by the central server 108 (e.g., by the processor 135 and the memory 133). In these examples, the user end (e.g., the device used to purchase the one or more goods 131 or services 132) or the device 119 of the seller 104 sends the central server 108 the purchase information 163. The central server 108 is configured to receive the purchase information 163. In some examples, the central server 108 is configured to store the purchase information 163 in the memory 133. The central server 108 (e.g., the processor 135) is configured to determine the particular user device based on the selection criteria 153 and based on the purchase information 163. For example, the processor 135 may implement the rule engine 152 to process the purchase information 163 in conjunction with the one or more selection criteria 153 and select the particular user device as described above with reference to the rule engine 152 implemented on the user end. In these examples, subsequent to the central server 108 selecting the particular user device, the central server 108 (e.g., the processor 135) is configured to request that the transportation provider 106 use the particular user device to provide the transportation service by sending information regarding the particular user device (e.g., the device ID of the particular user device) to the transportation provider 106.

The transportation provider 106 includes one or more transportation vehicles 105. The one or more transportation vehicles 105 may include different types of vehicles. For example, the one or more transportation vehicles 105 may include a self-driving drone vehicle, a self-driving automobile, a human-driven transportation vehicle, or a combination thereof. In the example illustrated in FIG. 1, the one or more transportation vehicles 105 include a first transportation vehicle 105a and a second transportation vehicle 105b. However, in other examples, the one or more transportation vehicles 105 include less than two devices or more than two devices. The one or more transportation vehicles 105 may include short range communication capability to communicate with the one or more user devices 103 to enable secure delivery and guidance.

The device 121 of the transportation provider 106 employs a selection engine 113. The selection engine 113 is implemented or executed by the device 121 of the transportation provider 106 and is configured to determine the delivery method, the particular user device (when the particular user device is not selected by the user end or the central server 108), the selected transportation vehicle, or a combination thereof. In some examples, the device 121 of the transportation provider 106 receives a device ID and attributes of the particular user device selected by the user end or by the central server 108 as described above, and the device 121 of the transportation provider 106 determines the selected transportation vehicle based on attributes of the particular user device, location information (e.g., from the purchase information 163), shipment information (e.g., from the purchase information 163), and capabilities of the one or more transportation vehicles 105. For example, the attributes 112a of the particular user device may indicate a particular type of drone landing pad to be used for delivery of the one or more goods 131, and the device 121 of the transportation provider 106 may select a particular drone of the one or more transportation vehicles 105 that is compatible with the particular user device (e.g., the first user device 103a) based on the attributes 112a of the particular user device (e.g., the first user device 103a). As another example, the attributes 112a of the particular user device may indicate that a particular user device is compatible with the particular drone of the one or more transportation vehicles 105, but the location information from the purchase information 163 may indicate that a distance from a warehouse of the transportation provider 106 to the delivery location is too far from the delivery location to use the particular drone. In this example, the device 121 of the transportation provider 106 may select a different type of drone with a longer flight range. As another example, the attributes 112a of the particular user device may indicate that a particular user device is compatible with the particular drone of the one or more transportation vehicles 105, but the shipment information from the purchase information 163 may indicate that the shipment is not suitable (e.g., is too heavy, large, or fragile) for delivery using the particular drone. In this example, the device 121 of the transportation provider 106 may select a different type of drone with a greater weight or size capacity. If the transportation provider 106 does not include a compatible device based on the attributes 112a, the location information, and the shipment information, the transportation provider 106 may resort to traditional manned vehicle delivery. Thus, the transportation provider 106 may determine the delivery method and vehicle based on information about a user device selected by the user end or the central server 108, capabilities of the vehicles available to the transportation provider 106, and information regarding the transportation service.

In other examples, the device 121 of the transportation provider 106 receives the attributes 112 of the one or more user devices 103 (e.g., all of the one or more user devices 103 as opposed to a selected particular user device), and the device 121 of the transportation provider 106 determines the particular user device, the delivery method, and the selected transportation vehicle based on the attributes 112, location information, shipment information, attributes of the one or more transportation vehicles 105, or a combination thereof. For example, the one or more user devices 103 may include a drone landing pad, a cell phone, and a home router and the device 121 of the transportation provider 106 may receive the attributes 112 of the drone landing pad, the cell phone, and the home router. The selection engine 113 may determine to use the drone landing pad when the transportation provider 106 includes a drone that is compatible with the drone landing pad, when a delivery location is within a maximum range from a warehouse of the transportation provider 106, and when the shipment is within weight and size limits of the drone. If the transportation provider 106 does not include a compatible device based on the attributes 112, the location information, and the shipment information, the transportation provider 106 may resort to traditional manned vehicle delivery. Thus, the transportation provider 106 may determine the particular user device, the delivery method, or the transportation vehicle, based on information about available devices of the user, capabilities of the vehicles available to the transportation provider 106, and information regarding the transportation service.

The device 121 of the transportation provider 106 may send a vehicle ID 134 of the selected transportation vehicle, along with a tracking number 136, to the central server 108. In examples in which the one or more goods 131 or services 132 correspond to goods, the seller 104 provides or tenders the one or more goods 131 to the transportation provider 106.

The transportation provider 106 provides the transportation service using the particular user device and the selected transportation vehicle and according to a security level 162. In some examples, the user indicates, during the purchase, a security level 162 associated with the purchase, and the device 119 of the seller 104 communicates the security level 162 to the device 121 of the transportation provider 106. Alternatively, in other examples, the security level 162 is set based on a nature of the shipment or government regulations. The security level 162 indicates a protocol selected from a group consisting of a near field communication (NFC) handshake between the delivery device and the particular user device using the vehicle ID and the tracking number, a video confirmation of delivery, a failure protocol, or a combination thereof. For example, when the user indicates that the security level 162 includes the NFC handshake, the transportation provider 106 may use a tracking number, a transportation vehicle ID, and device ID of the particular user device to perform a NFC handshake so that the transportation vehicle and the particular user device authenticate each other prior to delivery. In some examples, the central server 108 provides the particular user device, the selected transportation vehicle, or both, a private key that the particular user device and the selected transportation vehicle use to encrypt and decrypt communications. When the NFC handshake succeeds, the transportation service may be completed.

In one example, the purchase includes purchase of the one or more goods 131, the selected transportation vehicle (e.g., the first transportation vehicle 105a) corresponds to a self-driving drone, and the particular user device (e.g., the first user device 103a) corresponds to a drone landing pad. In this example, the particular user device (e.g., the first user device 103a) is configured to act as a beacon and broadcast a signal including the device ID 116 of the particular user device using a near field communication capability, such as BLUETOOTH. In this example, the selected transportation vehicle (e.g., the first transportation vehicle 105a) is configured to navigate to a general location of the particular user device using GPS or other navigation means. The selected transportation vehicle (e.g., the first transportation vehicle 105a) is additionally configured with an NFC capability and is configured to use the NFC capability and the device ID 116 stored by the selected transportation vehicle to identify and establish a connection with the particular user device (e.g., the first user device 103a). For example, the selected transportation vehicle (e.g., the first transportation vehicle 105a) may be configured to analyze beacon signals to identify, based on the device ID 116 stored by the selected transportation vehicle, the beacon signal that is broadcast by the particular user device and that includes the device ID 116. Subsequent to the selected transportation vehicle and the particular user device establishing a connection using the NFC capability, the particular user device and the selected transportation vehicle authenticate each other using the vehicle ID 134, the tracking number 136, or both, that are stored by the particular user device and the selected transportation vehicle. For example, the particular user device may communicate the tracking number 136 to the selected transportation vehicle, thereby enabling the selected transportation vehicle to authenticate the particular user device, and the selected transportation vehicle may communicate the vehicle ID 134 to the particular user device, thereby enabling the particular user device to authenticate the selected transportation vehicle.

If the authentication or handshake succeeds, the particular user device guides the selected transportation vehicle to the drone landing pad so that the drone docks at the drone landing pad. The selected transportation vehicle delivers the one or more goods 131 while docked at the drone landing pad. If the authentication or handshake fails, the selected transportation vehicle or the particular user device cancels the transportation service attempt, and the selected transportation vehicle, the particular user device, or both, perform a remedial action based on the security level 162. For example, when the authentication fails, the particular user device may alert law enforcement, notify the user of the failed authentication, or both. Additionally or alternatively, when the authentication fails, the selected transportation vehicle may destroy the one or more goods 131, alert security guards, travel to a closest human operated vehicle, return the one or more goods 131 to base, or a combination thereof.

In another example, the purchase includes purchase of the one or more services 132, the selected transportation vehicle (e.g., the first transportation vehicle 105a) corresponds to a self-driving taxi, and the particular user device (e.g., the first user device 103a) corresponds to a mobile phone. In this example, the particular user device (e.g., the first user device 103a) is configured to act as a beacon and broadcast a signal including the device ID 116 of the particular user device (e.g., the first user device 103a) using a near field communication capability, such as BLUETOOTH. In this example, the self-driving taxi is configured to navigate to a general location of the particular user device (e.g., the first user device 103a) using GPS or other navigation means. The self-driving taxi is additionally configured with an NFC capability and is configured to use the NFC capability and the device ID 116 stored by the self-driving taxi to identify and establish a NFC connection with the mobile phone. For example, the self-driving taxi may be configured to analyze beacon signals to identify, based on the device ID 116 stored by the self-driving taxi, the beacon signal that is broadcast by the particular user device (e.g., the first user device 103a) and that includes the device ID 116. Subsequent to the selected transportation vehicle (e.g., the first transportation vehicle 105a) establishing the NFC connection with the particular user device (e.g., the first user device 103a) using the NFC capability, the particular user device and the selected transportation vehicle authenticate one another using the vehicle ID 134, the tracking number 136, or both, that are stored by the particular user device and the selected transportation vehicle. For example, the particular user device may communicate the tracking number 136 to the selected transportation vehicle, thereby enabling the selected transportation vehicle to authenticate the particular user device, and the selected transportation vehicle may communicate the vehicle ID 134 to the particular user device, thereby enabling the particular user device to authenticate the selected transportation vehicle.

If the authentication or handshake succeeds, the selected transportation vehicle guides the user to the self-driving taxi so that the user may board the self-driving taxi and be transported to the user's destination. If the authentication or handshake fails, the selected transportation vehicle or the particular user device cancels the transportation service attempt, and the selected transportation vehicle, the particular user device, or both, performs a remedial action based on the security level 162. For example, when the authentication fails, the mobile phone may alert law enforcement, notify the user of the failed authentication, or both. Additionally or alternatively, when the authentication fails, the self-driving taxi may alert security guards, travel to a closest human operated vehicle, return to base, or a combination thereof.

Figure 2:
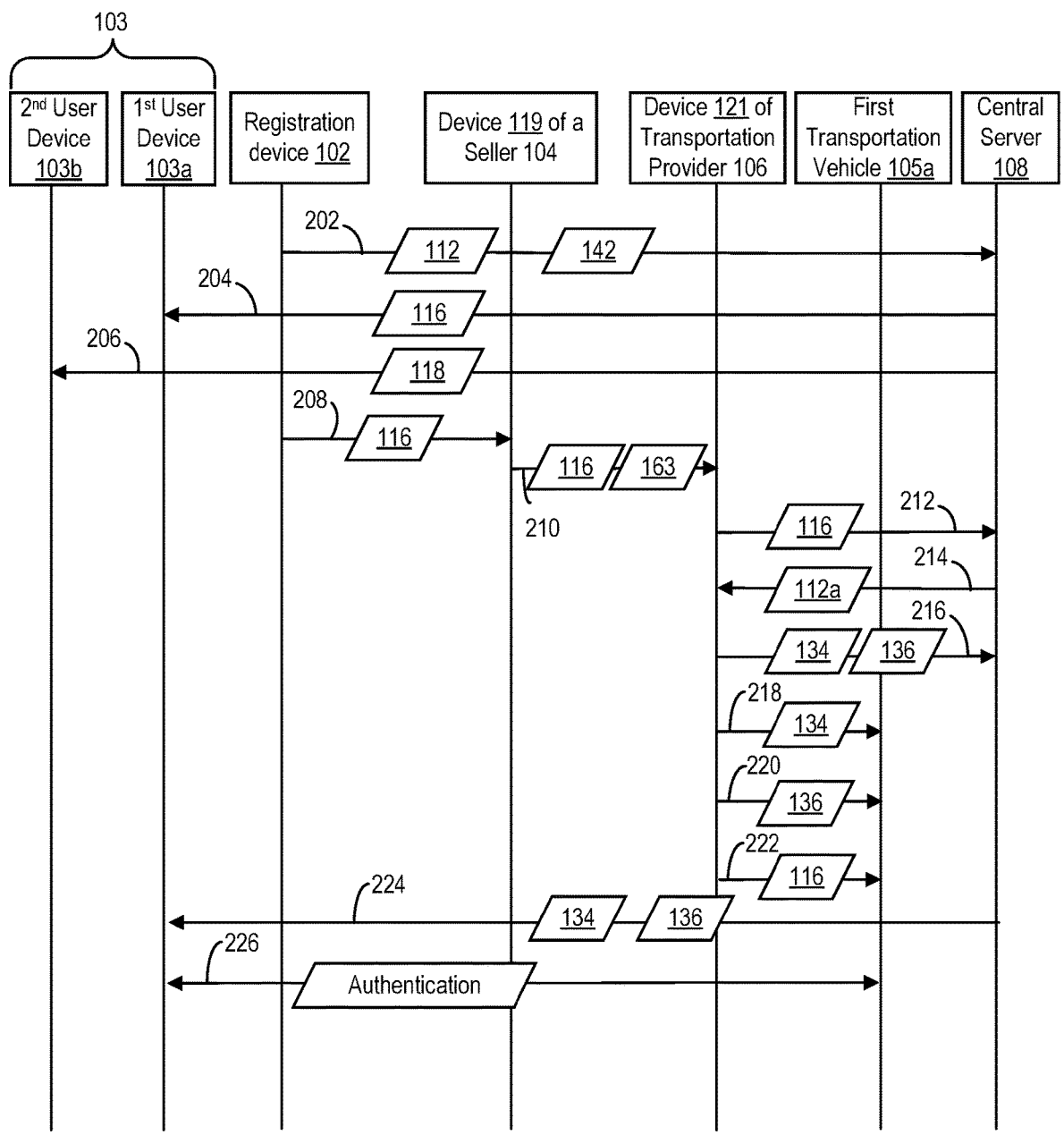
FIG. 2 shows an illustrative diagram of communications or aspects of delivery of an example of the system of FIG. 1.

With reference now to FIG. 2, a diagram illustrating example communication and transportation aspects of some examples of the system 100 of FIG. 1 is illustrated. At 202, a user uses the registration device 102 to register the one or more user devices 103 with the central server 108 as described above with reference to FIG. 1. During registration, the user provides (e.g., the registration device 102 sends via the internet 101) the attributes 112 of the one or more user devices 103 and the communication information 142 described above with reference to FIG. 1 to the central server 108.

During or subsequent to registration, the central server 108 (e.g., the processor 135) sends (e.g., or causes a transmitter to send), based on the communication information 142, the one or more user devices 103 respective device IDs. For example, at 204, the central server 108 sends, via the internet 101 and according to the communication information 142 (e.g., using the IP address of the first user device 103a learned from the communication information 142), the device ID 116 to the first user device 103a. As another example, at 206, the central server 108 sends, via the internet 101 and according to the communication information 142 (e.g., using the IP address of the first user device 103a learned from the communication information 142), the second user device 103b the device ID 118.

Subsequent to the registration, at 208, the user purchases the one or more goods 131 or services 132 from the seller 104 by interacting with the device 119 of the seller 104. In some examples, the user uses the internet 101 and the device used to purchase the one or more goods 131 or services 132 described above with reference to FIG. 1 to access a web page or a web application of the seller 104 to perform the purchase.

The user end (e.g., the device used to purchase the one or more goods 131 or services 132) sends, via the internet 101 to the device 119 of the seller 104, a device ID 116 of a particular user device (e.g., the first user device 103a) of the one or more user devices 103. In some examples, the user selects the particular user device manually and enters the device ID of the particular user device into a field of the web page or the web application used to purchase the one or more goods 131 or services 132 as described above with reference to FIG. 1. Additionally or alternatively, in some examples, the rule engine 152 implemented on the user end is configured to select the particular user device as described above with reference to FIG. 1.

The device 119 of the seller 104 sends, at 210 via the internet 101, the purchase information 163 described above with reference to FIG. 1, along with the device ID 116 of the particular user device, to the device 121 of the transportation provider 106. The device 121 of the transportation provider 106 sends, at 212 via the internet, the device ID 116 to the central server 108. In response to receiving the device ID 116 of the particular user device from the device 121 of the transportation provider 106, the central server 108 sends, at 214 via the internet 101, the attributes 112 of the particular user device to the device 121 of the transportation provider 106.

The device 121 of the transportation provider 106 selects a transportation vehicle to provide the transportation service associated with the one or more goods 131 or services 132 based on the attributes 112a, location information (e.g., from the purchase information 163), shipment information (e.g., from the purchase information 163), and capabilities of the one or more transportation vehicles 105. For example, the particular user device may correspond to a drone pad, and the transportation provider 106 may include multiple different types of drones. The device 121 of the transportation provider 106 may select, based on the attributes 112a of the particular type of drone pad, a particular type of drone to deliver the one or more goods 131 to the user based on determining that the particular type of drone is compatible with the particular type of drone pad. As another example, the attributes 112a of the particular user device may indicate that a particular user device is compatible with the particular drone of the one or more transportation vehicles 105, but the location information from the purchase information 163 may indicate that a distance from a warehouse of the transportation provider 106 to the delivery location is too far from the delivery location to use the particular drone. In this example, the device 121 of the transportation provider 106 may select a different type of drone with a longer flight range. As another example, the attributes 112a of the particular user device may indicate that a particular user device is compatible with the particular drone of the one or more transportation vehicles 105, but the shipment information from the purchase information 163 may indicate that the shipment is not suitable (e.g., is too heavy, large, or fragile) for delivery using the particular drone. In this example, the device 121 of the transportation provider 106 may select a different type of drone with a greater weight or size capacity. If the transportation provider 106 does not include a compatible device based on the attributes 112a, the location information, and the shipment information, the transportation provider 106 may resort to traditional manned vehicle delivery.

Subsequent to determining the selected transportation vehicle, at 216, the device 121 of the transportation provider 106 sends, to the central server 108 via the internet 101, a vehicle ID 134 of the selected transportation vehicle and a tracking number 136. The device 121 of the transportation provider 106 provides, at 218, 220, and 222, the vehicle ID 134, the tracking number 136, and the device ID 116 of the particular user device, to the selected transportation vehicle. The central server 108 sends, at 224, the vehicle ID 134 and the tracking number 136 to the particular user device using the communication information 142.

The transportation provider 106 performs, at 226, the transportation service using particular user device. For example, the transportation provider 106 may provide the transportation service using the particular device to perform a NFC handshake, to guide the transportation vehicle or the particular user device toward one another, or a combination thereof, as described above with reference to FIG. 1. In some examples, the transportation provider 106 provides the transportation service according to the security level 162 described above with reference to FIG. 1. In these examples, although not illustrated in FIG. 2, the user may send the security level 162 to the device 119 of the seller 104 and the particular user device, the device 119 of the seller 104 may send the security level 162 to the device 121 of the transportation provider 106, the device 121 of the transportation provider 106 may provide the security level 162 to the selected transportation vehicle, and the selected transportation vehicle and the particular user device may execute a protocol according to the security level 162 during the performance of the transportation service as described above with reference to FIG. 1.

Figure 3:
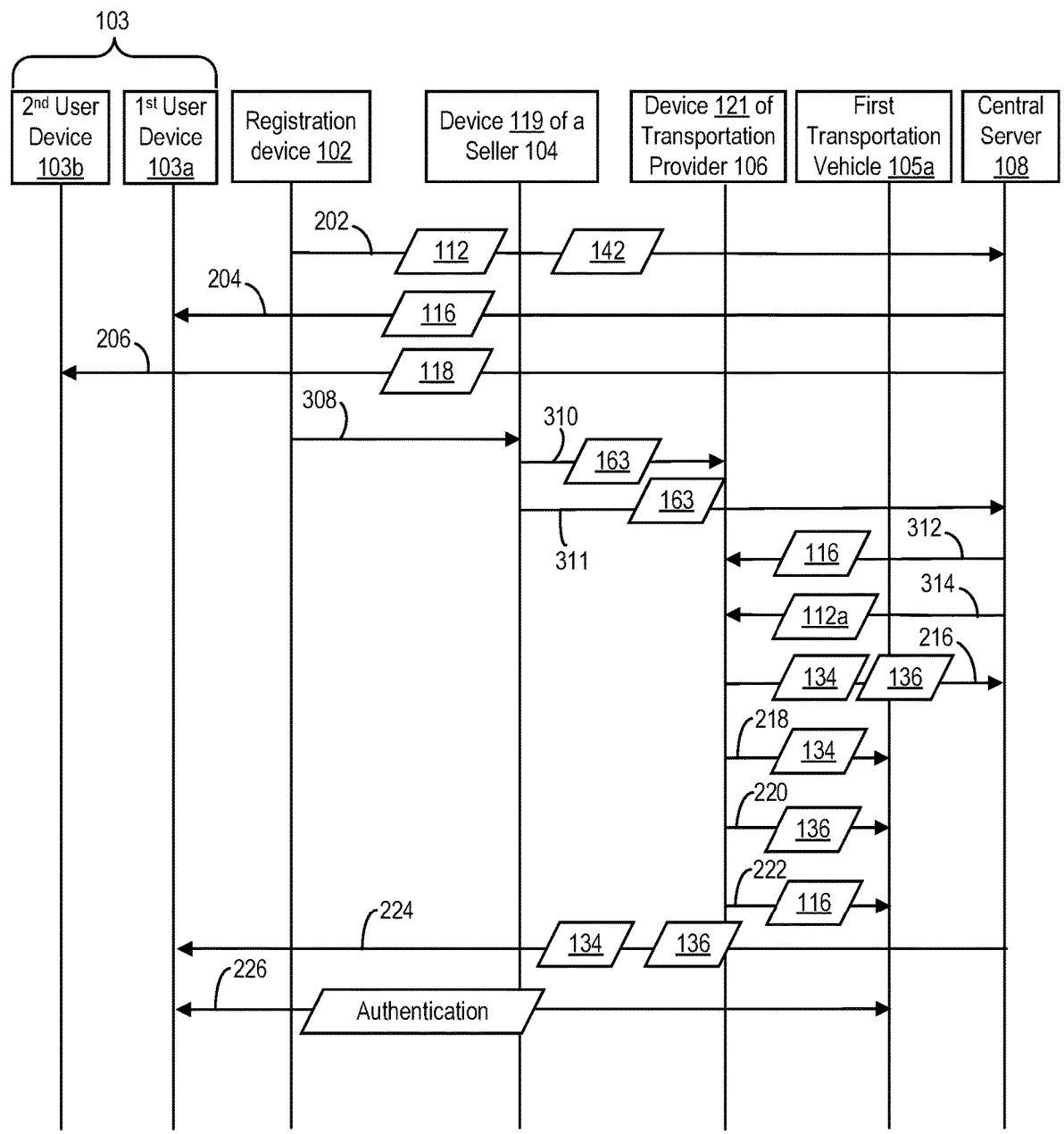
FIG. 3 shows an illustrative diagram of communications or aspects of delivery of an example of the system of FIG. 1.

With reference now to FIG. 3, a diagram illustrating example communication and transportation aspects of some examples of the system 100 of FIG. 1 is illustrated. Communications 202, 204, and 206 of FIG. 3 correspond to the communications 202, 204, and 206 of FIG. 2 and reference is made to 202, 204, and 206 of FIG. 2 for description of 202, 204, and 206 of FIG. 3. The user purchases, at 308, the one or more goods 131 or services 132 as described above with reference to FIG. 1. The device 119 of the seller 104 sends, at 310 via the internet 101, the purchase information 163, or a portion thereof, to the device 121 of the transportation provider 106. For example, the seller 104 may send the device 121 of the transportation provider 106 delivery location information and shipment information (e.g., attributes of the shipment, such as size, weight, fragile). The device 119 of the seller 104 sends, at 310 via the internet 101, the purchase information 163 to the central server 108. For example, the device 119 of the seller 104 may send the central server 108 delivery location information and shipment information (e.g., attributes of the shipment, such as size, weight, fragile). Although FIG. 3 illustrates the device 119 of the seller 104 sending the purchase information 163 to the central server 108, in other examples, alternatively or additionally, the device 121 of the transportation provider 106 sends the central server 108 the purchase information 163.

The central server 108 selects the particular user device using the rule engine 152 (e.g., the selection criteria 153) implemented on the central server 108 in conjunction with the purchase information 163 as described above with reference to FIG. 1. The central server 108 sends, at 312 via the internet 101, the device ID 116 of the particular user device to the device 121 of the transportation provider 106. The central server 108 sends, at 314 via the internet 101, the attributes 112a of the particular user device to the device 121 of the transportation provider 106.

The device 121 of the transportation provider 106 selects a transportation vehicle to provide the transportation service associated with the one or more goods 131 or services 132 based on the attributes 112a, location information, shipment information, and capabilities of the one or more transportation vehicles 105. For example, the particular user device may correspond to a drone pad, and the transportation provider 106 may include multiple different types of drones. The device 121 of the transportation provider 106 may select, based on the attributes 112a, a particular type of drone to deliver the one or more goods 131 to the user based on determining that the particular type of drone is compatible with the drone pad of the user.

Communications 216, 218, 220, 222, 224, and 226 of FIG. 3 correspond to the communications 216, 218, 220, 222, 224, and 226 of FIG. 2 and are therefore not separately described.

Figure 4:
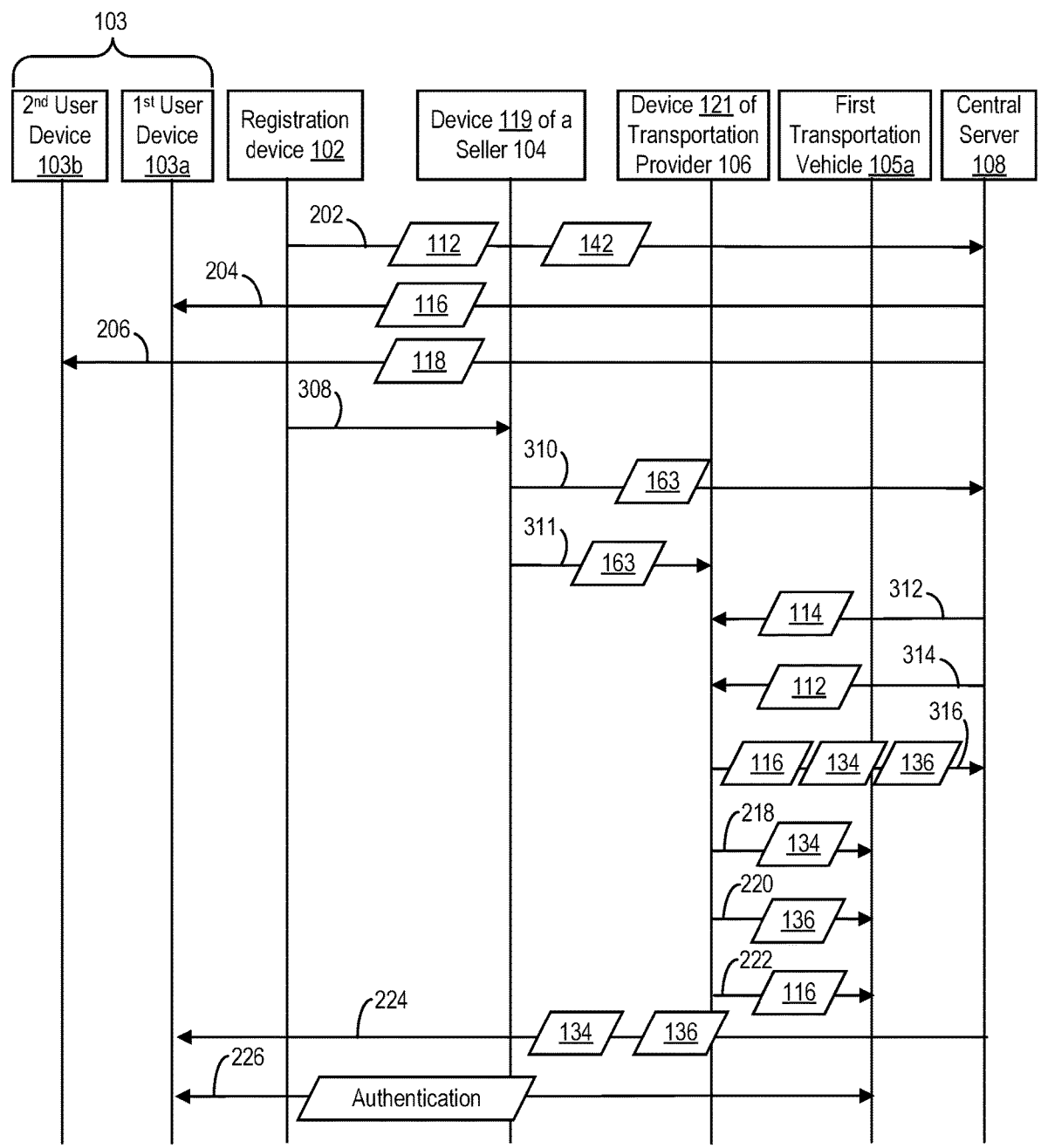
FIG. 4 shows an illustrative diagram of communications or aspects of delivery of an example of the system of FIG. 1.

With reference now to FIG. 4, a diagram illustrating example communication and transportation aspects of some examples of the system 100 of FIG. 1 is illustrated. Communications 202, 204, 206, and 308 of FIG. 4 correspond to the communications 202, 204, 206, 308, 310, and 311 of FIG. 3 and reference is made to 202, 204, 206, 308, 310, and 311 of FIG. 3 for description of 202, 204, 206, 308, 310, and 311 of FIG. 4. The user purchases, at 308, the one or more goods 131 or services 132 as described above with reference to FIG. 1.

The central server 108 sends, at 312 via the internet 101, the device IDs 114 of the one or more user devices to the device 121 of the transportation provider 106. The central server 108 sends, at 314 via the internet 101, the attributes 112 of the one or more user devices 103 to the device 121 of the transportation provider 106.

The device 121 of the transportation provider 106 determines a particular user device and a selected transportation vehicle to provide the transportation service associated with the one or more goods 131 or services 132 based on the attributes 112, location information (e.g., from the purchase information 163), shipment information (e.g., from the purchase information 163), and capabilities of the one or more transportation vehicles 105 as described above with reference to FIG. 1.

The device 121 of the transportation provider 106 sends (at 316) to the central server 108 via the internet 101, a vehicle ID 134 of the selected transportation vehicle, a tracking number 136, and the device ID 116 of the particular user device.

Communications 218, 220, 222, 224, and 226 of FIG. 4 correspond to the communications 218, 220, 222, 224, and 226 of FIG. 3 and are therefore not separately described.

Figure 5:
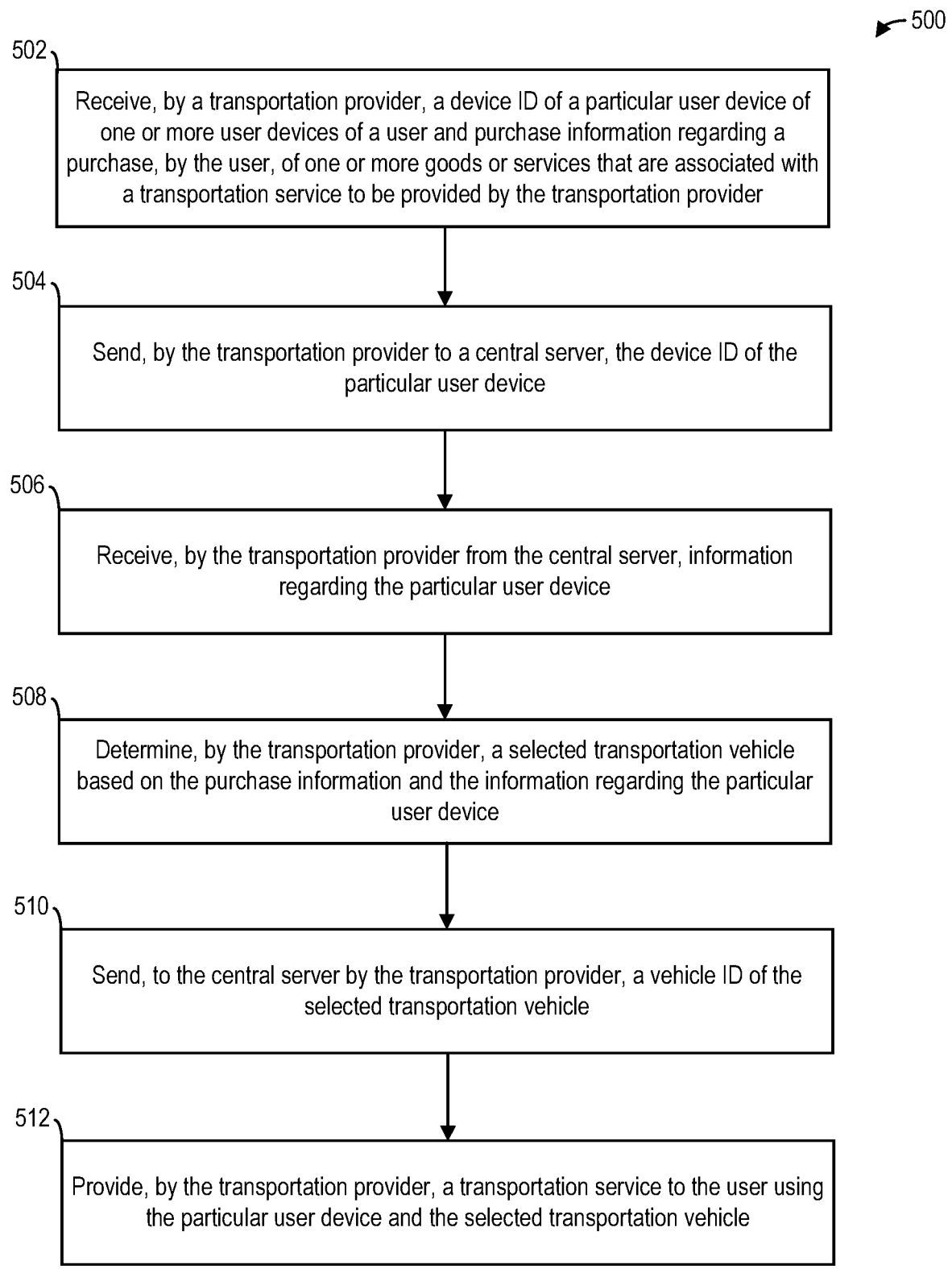
FIG. 5 shows a flow diagram illustrating aspects of operations that may be performed by a transportation provider to provide secure and/or adaptable transportation of goods or services.

With reference to FIG. 5, a method 500 of providing secure and/or adaptable transportation services is described. The method 500 may be performed by the transportation provider 106 (e.g., the device 121 and a selected transportation vehicle of the transportation provider 106) described above with reference to FIG. 1. In some examples, the selected transportation vehicle is selected from a group consisting of an unmanned vehicle, a taxi, and a drone. In some examples, aspects of the method 500 are computer-implemented.

The method 500 includes, at 502, receiving, by a device of a transportation provider, a device ID of a particular user device of one or more user devices of a user and purchase information regarding a purchase, by the user, of one or more goods or services that are associated with a transportation service to be provided by the transportation provider. The one or more user devices may correspond to the one or more user devices 103 described above with reference to FIGS. 1-4. The particular user device may be selected by the user end. For example, as described above with reference to FIGS. 1 and 2, the user may select the particular user device at the time of purchase. Alternatively, as described above in more detail with reference to FIGS. 1 and 2, the rule engine 152 implemented on the device used to purchase the one or more goods 131 or services 132 may select the particular user device based on the selection criteria 153. The device ID may correspond to the device ID 116 described above with reference to FIGS. 1 and 2. The purchase information may correspond to the purchase information 163 described above with reference to FIGS. 1 and 2. The purchase information 163 may indicate attributes (e.g., size, weight, fragile) of the one or more goods 131 or services 132, may indicate a location associated with the user (e.g., a delivery location), or a combination thereof.

The method 500 further includes, at 504, sending, by the device of the transportation provider to a central server, the device ID of the particular user device. The device of the transportation provider may send the device ID of the particular user device to the central server as described in more detail above with reference to FIG. 1 and the communication 212 of FIG. 2.

The method 500 further includes, at 506, receiving, by the device of the transportation provider from the central server, information regarding the particular user device. The information regarding the particular user device may correspond to the attributes 112a described above with reference to FIG. 1. The device of the transportation provider may receive the information regarding the particular user device via the internet.

The method 500 further includes, at 508, determining, by the device of the transportation provider, a selected transportation vehicle based on the information regarding the particular user device received from the central server and based on the purchase information. In some examples, the device of the transportation provider determines the selected transportation vehicle based on attributes of the particular user device, location information (e.g., from the purchase information 163), shipment information (e.g., from the purchase information 163), and capabilities of the one or more transportation vehicles 105. For example, the attributes 112a of the particular user device may indicate a particular type of drone landing pad to be used for delivery of the one or more goods 131, and the device of the transportation provider 106 may select a particular drone of the one or more transportation vehicles 105 that is compatible with the particular user device (e.g., the first user device 103a) based on the attributes 112a of the particular user device (e.g., the first user device 103a). As another example, the attributes 112a of the particular user device may indicate that a particular user device is compatible with the particular drone of the one or more transportation vehicles 105, but the location information from the purchase information 163 may indicate that a distance from a warehouse of the transportation provider 106 to the delivery location is too far from the delivery location to use the particular drone. In this example, the device of the transportation provider 106 may select a different type of drone with a longer flight range. As another example, the attributes 112a of the particular user device may indicate that a particular user device is compatible with the particular drone of the one or more transportation vehicles 105, but the shipment information from the purchase information 163 may indicate that the shipment is not suitable (e.g., is too heavy, large, or fragile) for delivery using the particular drone. In this example, the device of the transportation provider 106 may select a different type of drone with a greater weight or size capacity. If the transportation provider 106 does not include a compatible device based on the attributes 112a, the location information, and the shipment information, the transportation provider 106 may resort to traditional manned vehicle delivery.

In some examples, the particular user device is a drone landing pad, and determining the selected transportation vehicle at 508 includes determining a distance from a warehouse of the transportation provider to a delivery location indicated by the purchase information, comparing the distance to a threshold value, determining whether the drone is compatible with the drone landing pad based on the information regarding the particular user device, determining whether a shipment corresponding to the one or more goods or services satisfies weight and size criteria associated with the drone, or a combination thereof. In some of these examples, determining the selected transportation vehicle at 508 includes determining the selected transportation vehicle to correspond to the drone when the distance is less than the threshold value, when the drone is compatible with the drone landing pad, and when the shipment satisfies the weight and size criteria.

The method 500 further includes, at 510, sending, to the central server by the device of the transportation provider, a vehicle ID of the selected transportation vehicle. The device of the transportation provider may send the vehicle ID of the selected transportation vehicle to the central server as described above with reference to FIGS. 1 and 216 of FIG. 2.

The method 500 further includes, at 512, providing, by the transportation provider, a transportation service to the user using the particular user device and the selected transportation vehicle. The transportation service includes delivering the one or more goods 131 or providing the one or more services 132. For example, the one or more goods 131 may include a product or meal, and the transportation provider may deliver the product or the meal using the particular user device. Alternatively or additionally, the one or more services 132 may include a passenger transportation service, such as taxi service.

The transportation provider may provide the transportation service using the particular user device to guide the selected transportation vehicle to the particular user device. To illustrate, in an example, the one or more goods 131 or services 132 correspond to a product, the selected transportation vehicle includes a self-driving drone, and the particular user device includes a drone landing pad. In this example, the self-driving drone may navigate to a general location (e.g., learned from the purchase information 163) of the drone landing pad using GPS and connect with the drone landing pad using NFC capabilities of the self-driving drone and the drone landing pad. Once the NFC connection is established, the drone landing pad may interact with the self-driving drone to navigate the self-driving drone to dock with the drone landing pad and complete delivery of the product.

The transportation provider may provide the transportation service using the particular user device to guide the particular user device to the selected transportation vehicle. To illustrate, in an example, the one or more goods 131 or services 132 include a passenger transportation service, the selected transportation vehicle includes an unmanned vehicle, and the particular user device includes a cell phone. In this example, the unmanned vehicle may navigate to a general location (e.g., learned from the purchase information 163) of the cell phone or user using GPS and connect with the cell phone using NFC capabilities of the unmanned vehicle and the cell phone once the unmanned vehicle is within a particular vicinity of the cell phone. Once the NFC connection is established, the unmanned vehicle may interact with the cell phone to navigate the user to the unmanned vehicle so that the unmanned vehicle can complete pick up of the user and transport the user to the user's destination.

In some examples, the method 500 further includes sending, to the central server from the device of the transportation provider, a tracking number associated with the transportation service. In these examples, providing the transportation service to the user includes interacting with the particular user device to verify, using the vehicle ID and the tracking number, the particular user device. For example, the selected transportation vehicle may interact with the particular user device using a near field communication capability to perform a handshake using the vehicle ID and the tracking number as described above with reference to FIG. 1.

In some examples, the method 500 further includes receiving, by the device of the transportation provider, a security level that is associated with the transportation service. The transportation service is provided to the user according to the security level. The security level may correspond to the security level 162 described above with reference to FIG. 1. In some examples, the security level indicates a protocol selected from a group consisting of a near field communication (NFC) handshake between the delivery device and the particular user device using the vehicle ID and the tracking number, a video confirmation of delivery, a failure protocol, or a combination thereof. In some examples, the failure protocol includes destroying the goods, alerting the user, alerting law enforcement, alerting security guards, traveling to closest human operated vehicle, returning to base, or a combination thereof.

Figure 6:
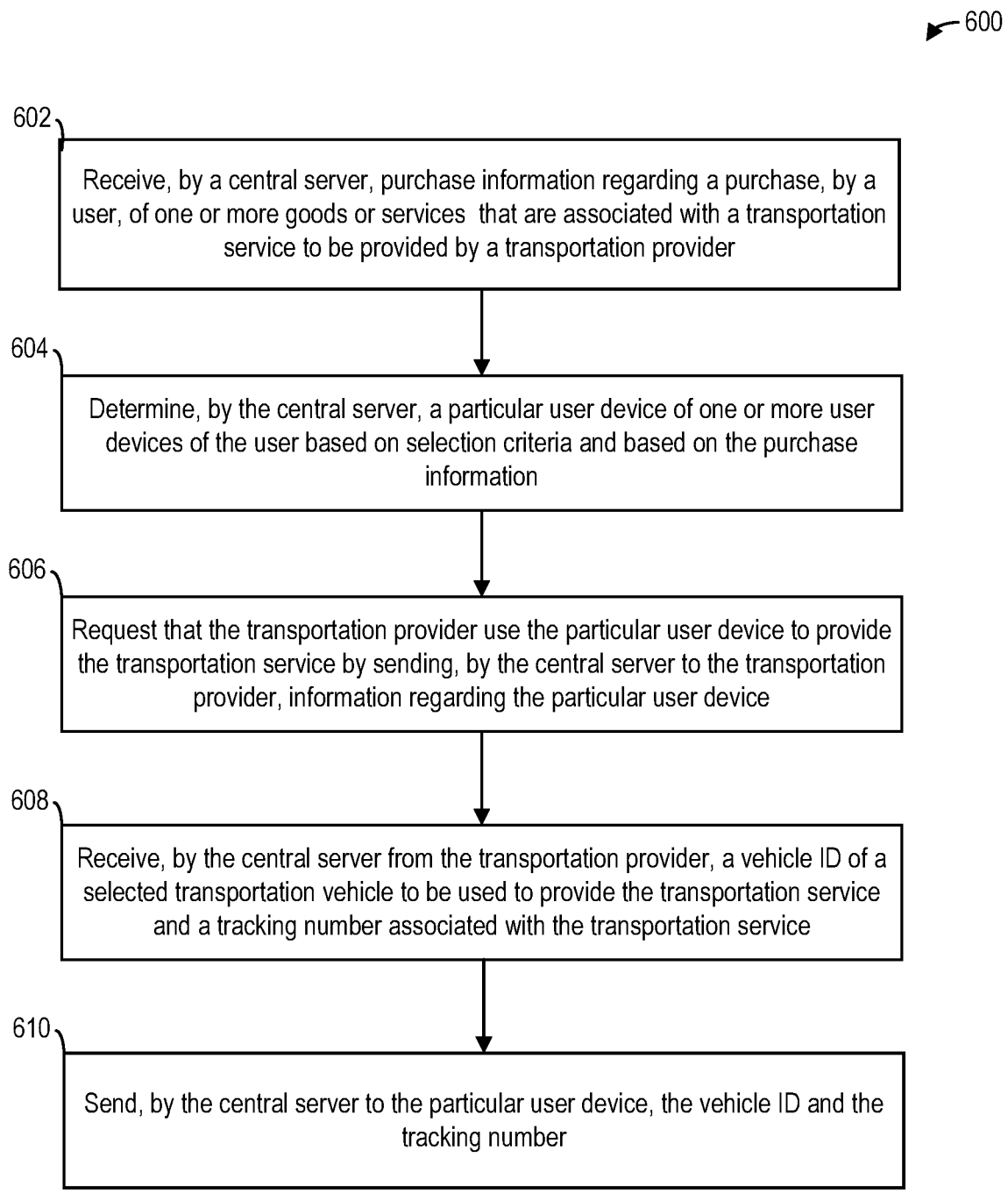
FIG. 6 shows a flow diagram illustrating aspects of operations that may be performed by a central server to provide secure and/or adaptable transportation of goods or services.

With reference to FIG. 6, a computer-implemented method is described. The method 600 may be performed by the central server 108 described above with reference to FIG. 1. The method 600 includes, at 602, receiving, by a central server, purchase information regarding a purchase, by a user, of one or more goods or services that are associated with a transportation service to be provided by the transportation provider. The device of the seller or the device of the transportation provider may send the purchase information to the central server as described above with reference to FIG. 3. The one or more goods or services may correspond to the one or more goods 131 or services 132 described above with reference to FIG. 1. The transportation provider may correspond to the transportation provider 106 described above with reference to FIG. 1, and the device of the transportation provider may correspond to the device 121 described above with reference to FIG. 1. The seller may correspond to the seller 104 described above with reference to FIG. 1, and the device of the seller may correspond to the device 119 described above with reference to FIG. 1. In some examples, the seller is the transportation provider. The purchase information may correspond to the purchase information 163 described above with reference to FIG. 1.

The method 600 includes, at 604, determining, by the central server, a particular user device of one or more user devices of the user based on selection criteria and based on the purchase information. For example, the central server may include the rule engine 152 described above with reference to FIG. 1. In these examples, the rule engine 152 implemented on the central server 108 processes the purchase information 163 in conjunction with the one or more selection criteria 153 and selects the particular user device as described above with reference to the rule engine 152 of FIG. 1 implemented on the user end.

The method 600 includes, at 606, requesting that the transportation provider use the particular user device to provide the transportation service by sending, by the central server to the device of the transportation provider, information regarding the particular user device. For example, the central server may request that the transportation provider use the particular user device selected by the central server by sending the device 121 of the transportation provider 106 the attributes 112*a* of the particular user device via the internet as described above with reference to the communication 314 of FIG. 3.

The method 600 includes, at 608, receiving, by the central server from the device of the transportation provider, a vehicle ID of a selected transportation vehicle to be used to provide the transportation service and a tracking number associated with the transportation service. For example, the vehicle ID may correspond to the vehicle ID 134 described above with reference to FIGS. 1 and 3, the tracking number may correspond to the tracking number 136 described above with reference to FIGS. 1 and 3, and the central server may receive the vehicle ID and the tracking number 136 via the internet as described above with reference to FIG. 1 and communication 216 of FIG. 3. In some examples, the selected transportation vehicle is selected from a group consisting of an unmanned vehicle, a taxi, and a drone.

The method 600 includes, at 610, sending, by the central server to the particular user device, the vehicle ID and the tracking number. The central server may send the vehicle ID and the tracking number to the particular user device using the internet and the communication information 142 described above with reference to FIG. 1 and communication 224 of FIG. 3.

In some examples, the method 600 additionally includes receiving, by the central server from a registration device, attributes of the one or more user devices. For example, the central server may receive the attributes 112 of the one or more user device 103 as described above with reference to FIG. 1 and communication 202 of FIGS. 2-4. In some examples, the method 600 additionally includes generating, by the central server, one or more device IDs for the one or more user devices. For example, the central server may generate the device IDs 114 as described above with reference to FIG. 1. Each of the one or more user devices is assigned a different device ID than each other of the one or more user devices. In some examples, the method 600 further includes sending, by the central server, the one or more device IDs to the one or more user devices. For example, the central server may send the device IDs 116 and 118 to the first user device 103*a* and the second user device 103*b* as described above with reference to FIG. 1 and the communications 204 and 206 of FIGS. 2-4. In some examples, the method 600 further includes sending a device ID of the particular user device to device of the transportation provider. For example, the central server may send the device ID 116 to the device 121 of the transportation provider as described above with reference to FIG. 1 and communication 312 of FIG. 3.

Figure 7:
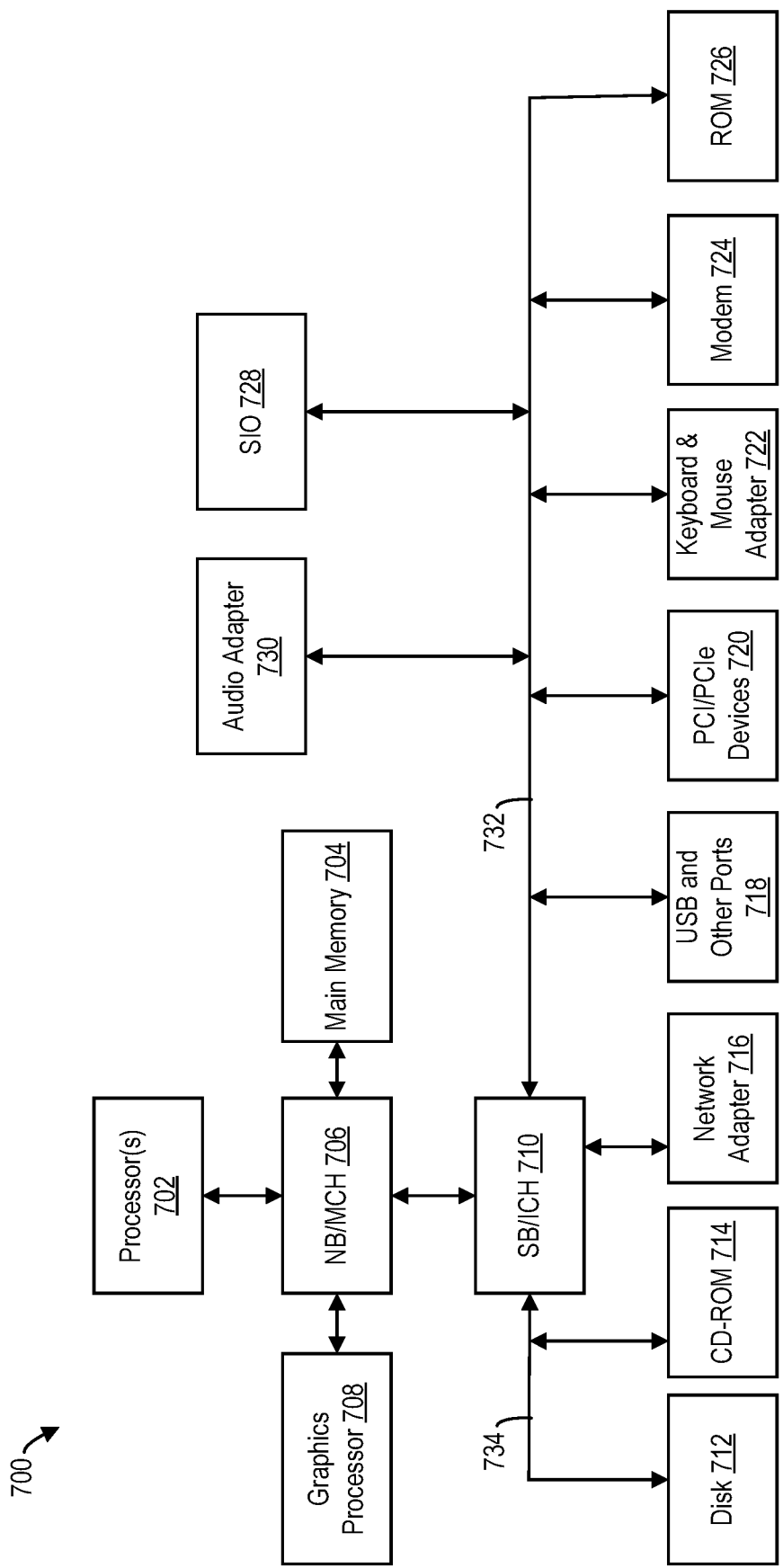
FIG. 7 shows an illustrative block diagram of an example central server that can be applied to implement embodiments of the present disclosure.

FIG. 7 is a block diagram of an example of a central server 700 in which aspects of the illustrative embodiments may be implemented. The central server 700 is an example of a computer that can be applied to implement aspects of the central server 108 of FIG. 1 and in which computer usable code or instructions implementing the processes for illustrative embodiments of the central server may be located. In one illustrative embodiment, FIG. 7 represents a computing device that implements the central server 108 of FIG. 1 augmented to include the additional mechanisms of the illustrative embodiments described hereafter.

In the depicted example, the central server 108 employs a hub architecture including north bridge and memory controller hub (NB/MCH) 706 and south bridge and input/output (I/O) controller hub (SB/ICH) 710. Processor(s) 702, main memory 704, and graphics processor 708 are connected to NB/MCH 706. Graphics processor 708 may be connected to NB/MCH 706 through an accelerated graphics port (AGP).

In the depicted example, local area network (LAN) adapter 716 connects to SB/ICH 710. Audio adapter 730, keyboard and mouse adapter 722, modem 724, read only memory (ROM) 726, hard disk drive (HDD) 712, compact disc read only memory (CD-ROM) drive 714, universal serial bus (USB) ports and other communication ports 718, and peripheral component interconnect/peripheral component interconnect express (PCI/PCIe) devices 720 connect to SB/ICH 710 through bus 732 and bus 734. PCI/PCIe devices may include, for example, Ethernet adapters, add-in cards, and personal computer (PC) cards for notebook computers. PCI uses a card bus controller, while PCIe does not. ROM 726 may be, for example, a flash basic input/output system (BIOS).

HDD 712 and CD-ROM drive 714 connect to SB/ICH 710 through bus 734. HDD 712 and CD-ROM drive 714 may use, for example, an integrated drive electronics (IDE) or serial advanced technology attachment (SATA) interface. Super I/O (SIO) device 728 may be connected to SB/ICH 710.

An operating system runs on processor(s) 702. The operating system coordinates and provides control of various components within the central server 700 in FIG. 7. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on central server 700.

In some embodiments, the central server 700 may be, for example, an IBM® eServer™ System p® computer system, running the Advanced Interactive Executive (AIX®) operating system or the LINUX® operating system. The central server 700 may be a symmetric multiprocessor (SMP) system including a plurality of processors 702. Alternatively, a single processor system may be employed.

Instructions for the operating system, the object-oriented programming system, and applications or programs are located on storage devices, such as HDD 712, and may be loaded into main memory 704 for execution by processor(s) 702. The processes for illustrative embodiments of the present disclosure may be performed by processor(s) 702 using computer usable program code, which may be located in a memory such as, for example, main memory 704, ROM 726, or in one or more peripheral devices 712 and 714, for example.

A bus system, such as bus 732 or bus 734 as shown in FIG. 7, may include one or more buses. The bus system may be implemented using any type of communication fabric or architecture that provides for a transfer of data between different components or devices attached to the fabric or architecture. A communication unit, such as modem 724 or LAN adapter 716 of FIG. 7, may include one or more devices used to transmit and receive data. A memory may be, for example, main memory 704, ROM 726, or a cache such as found in NB/MCH 706 in FIG. 7.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read only memory (EPROM) or Flash memory, an static random access memory (SRAM), a portable CD-ROM, a digital video disc (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
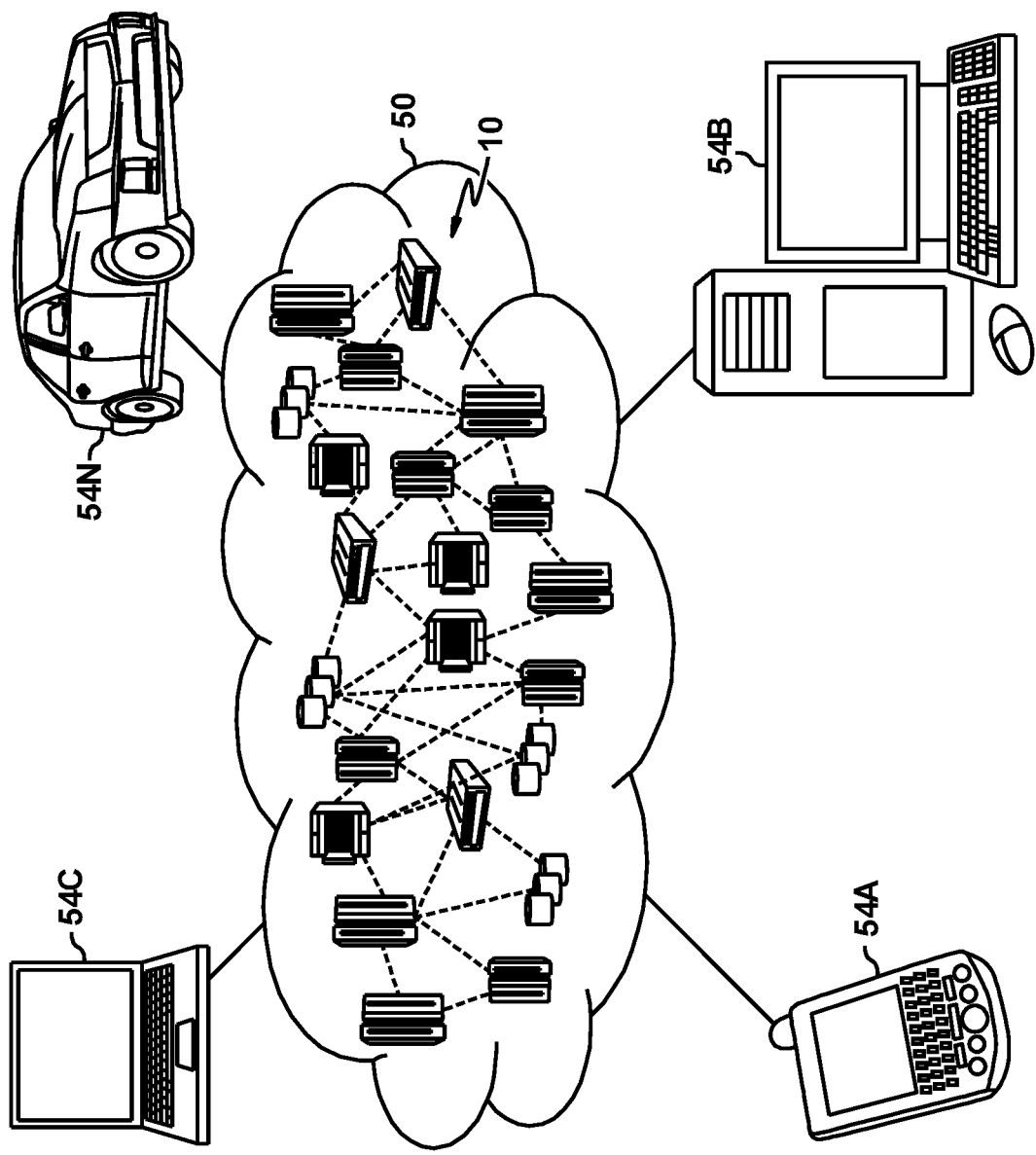
FIG. 8 depicts a cloud computing environment according to various embodiments.
Figure 9:
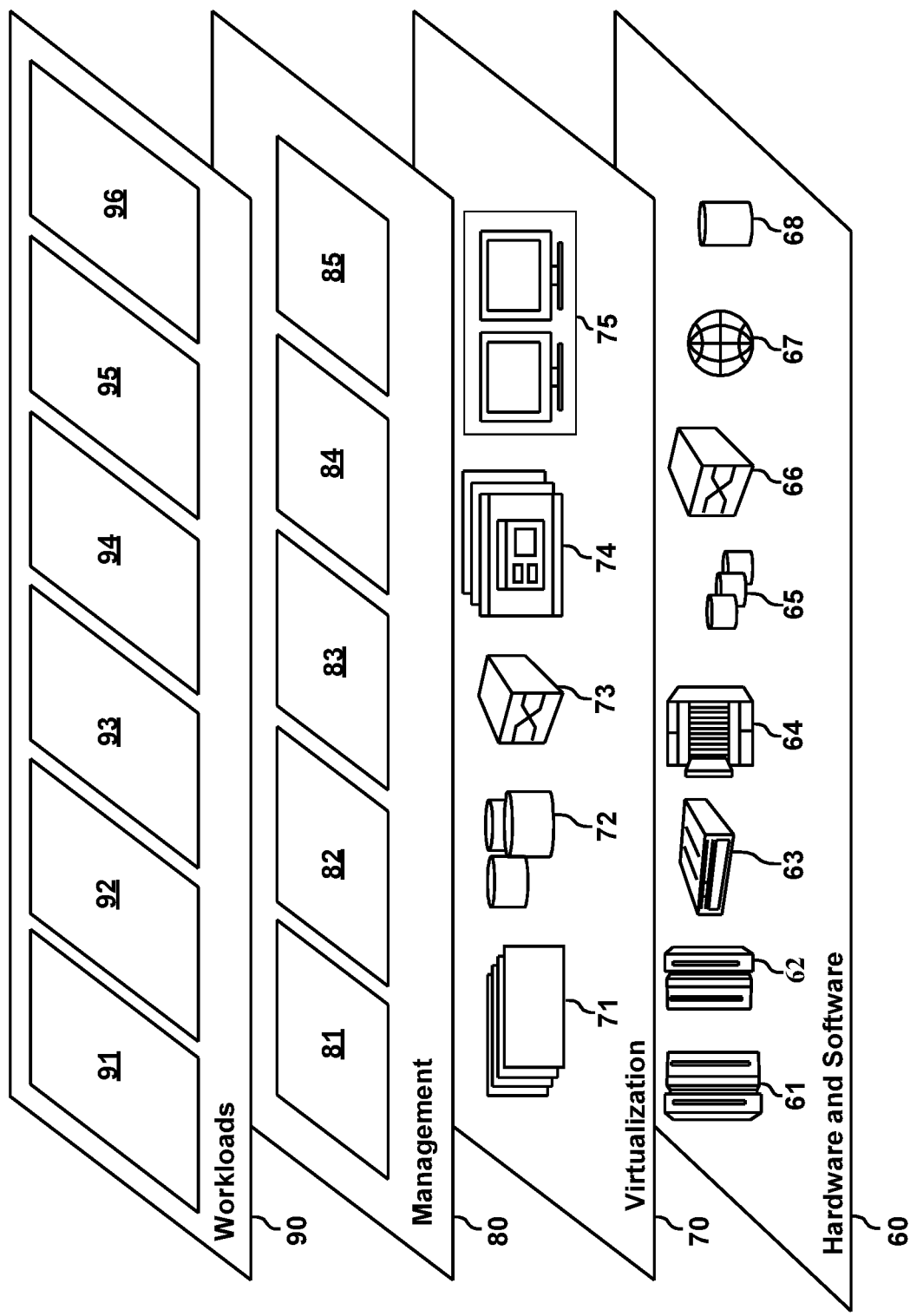
FIG. 9 depicts abstraction model layers according to various embodiments.

Turning now to FIGS. 8 and 9, it is to be understood that although this disclosure includes a detailed description related to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include on-demand self-service, broad network access, resource pooling, rapid elasticity, and/or measured service. On-demand self-service is a characteristic in which a cloud consumer can unilaterally provision computing capabilities, such as server time and network storage, as needed automatically without requiring human interaction with the service's provider. Broad network access is a characteristic in which capabilities are available over a network and accessed through standard mechanisms that promote use by heterogeneous thin or thick client platforms (e.g., mobile phones, laptops, and personal digital assistants (PDAs)). Resource pooling is a characteristic in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity is a characteristic in which capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is a characteristic in which cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The cloud model Service Models may include Software as a Service (SaaS), Platform as a Service (PaaS), and/or Infrastructure as a Service (IaaS).

SaaS is a service model in which the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. PaaS is a service model in which the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is a service model in which the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include private cloud, community cloud, public cloud, and/or hybrid cloud. Private cloud is a deployment model in which the cloud infrastructure is operated solely for an organization. It may be managed by the organization or a third party and may exist on-premises or off-premises. Community cloud is a deployment model in which the cloud infrastructure is shared by several organizations and supports a specific community that has shared concerns (e.g., mission, security requirements, policy, and compliance considerations). It may be managed by the organizations or a third party and may exist on-premises or off-premises. Public cloud is a deployment model in which the cloud infrastructure is made available to the general public or a large industry group and is owned by an organization selling cloud services. Hybrid cloud is a deployment model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that cloud computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The hardware and software components of hardware and software layer 60 may serve as the underlying computing components on which cloud computing functions are executed in response to receipt of a request for performance of a function and/or service offered as a part of cloud computing environment 50 such as, for example, the domain adaptation described above.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. These virtual entities may enable a subscriber to cloud computing environment 50 to interact indirectly with the hardware and software components of hardware and software layer 60 indirectly via virtual layer 70 without having a specific knowledge of, or interacting directly with, hardware and software layer 60. For example, a plurality of subscribers may interact with virtualization layer 70 to respectively access a corresponding plurality of virtual servers 71 and virtual storage 72 that all exist as separate threads, instances, partitions, etc., on a single server 62 and storage device 65, respectively. In such a scenario, virtualization layer 70 may cause each virtual server 71 and virtual storage 72 to appear to each subscriber as a dedicated and seamless computing and storage device, while enabling efficient operation of the hardware and software components of hardware and software layer 60 by reducing a potential for redundancy of components.

In one example, management layer 80 may provide the functions described below via an abstraction layer such that a subscriber to cloud computing environment 50 may interact with virtualization layer 70 and/or hardware and software layer 60 indirectly via management layer 80 without having a specific knowledge of, or interacting directly with, virtualization layer 70 and/or hardware and software layer 60. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Management layer 80 enables a subscriber to cloud computing environment 50 to interact with cloud computing environment 50 through management layer 80 to perform tasks and functions (e.g., administrative tasks) separate from actual execution of functions in the cloud computing environment 50. For example, an administrator may request access to a certain amount of computing resources (e.g., as provided in virtualization layer 70 and/or hardware and software layer 60) in cloud computing environment 50 via management layer 80 without having a specific knowledge of, or interacting directly with, virtualization layer 70 and/or hardware and software layer 60.

Workloads layer 90 provides examples of functionality for which the cloud computing environment may be utilized. The workloads and functions illustrated in workloads layer 90 are merely exemplary workloads and functions that may be executed in cloud computing environment 50 at the request or direction of a subscriber to cloud computing environment 50, and are not limited to those explicitly recited herein. Examples of workloads and functions which may be provided from this layer include: mapping and navigation 91; software development and lifecycle management 92; virtual classroom education delivery 93; data analytics processing 94; transaction processing 95; and user device selection 96 (e.g., as described above with reference to the rule engine 152 of FIG. 1). These workloads and functions of workloads layer 90 may be end-user applications that enable a subscriber to cloud computing environment 50 to interact with any of management layer 80, virtualization layer 70, and/or hardware and software layer 60 indirectly via workloads layer 90 without having a specific knowledge of, or interacting directly with, any of management layer 80, virtualization layer 70, and/or hardware and software layer 60. In this manner, the subscriber and/or an end user who accesses cloud computing environment 50 may not require any form of specialized knowledge relating to the composition or operation of any of management layer 80, virtualization layer 70, and/or hardware and software layer 60 to perform the workloads and functions of workloads layer 90. In such a scenario, the workloads and functions of workloads layer 90 are said to be abstracted from management layer 80, virtualization layer 70, and hardware and software layer 60 because workloads layer 90 hides the underlying operation of management layer 80, virtualization layer 70, and hardware and software layer 60 from the subscriber and/or end-user while still enabling the subscriber and/or end-user to indirectly interact with management layer 80, virtualization layer 70, and/or hardware and software layer 60 to receive the computer processing benefits thereof via workloads layer 90.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing an automated transportation service, the method comprising:
receiving, by a device of a transportation provider, a device identification (ID) of a particular user device of one or more user devices of a user and purchase information regarding a purchase, by the user via the particular user device, of one or more goods or services to be provided to the user using the automated transportation service;

sending, by the device of the transportation provider, the device ID of the particular user device to a central server;

receiving, by the device of the transportation provider from the central server, information regarding the particular user device;

determining, by the device of the transportation provider, a selected self-driving transportation vehicle based on the purchase information and the information regarding the particular user device;

sending, by the device of the transportation provider, a vehicle ID of the selected self-driving transportation vehicle to the central server;

controlling the selected self-driving transportation vehicle, by sending instructions to the selected self-driving transportation vehicle, to navigate to a general location of the particular user device according to global positioning system signals until the selected self-driving transportation vehicle detects a near field communication signal of the particular user device;

controlling the selected self-driving transportation vehicle, by sending instructions to the selected self-driving transportation vehicle, performing, via near field communication, a handshake procedure between the selected self-driving transportation vehicle and the particular user device to authenticate each other via the device ID and the vehicle ID; and upon determining a successful completion of the handshake procedure, controlling the selected self-driving transportation vehicle, by sending instructions to the selected self-driving transportation vehicle, to navigate to a landing pad of the particular user device according to the near field communication after having navigated to the general location of the particular user device according to global positioning system signals.

2. The method of claim 1, further comprising sending a tracking number associated with the transportation service to the central server from the device of the transportation provider, and wherein providing the transportation service to the user includes the selected self-driving transportation vehicle interacting with the particular user device to verify the particular user device using the tracking number.

3. The method of claim 2, further comprising receiving, by the device of the transportation provider, a security level that is associated with the transportation service, and wherein the transportation service is provided to the user according to the security level.

4. The method of claim 3, wherein the security level indicates a protocol selected from a group consisting of a near field communication (NFC) handshake between the selected self-driving transportation vehicle and the particular user device using the vehicle ID and the tracking number, a video confirmation of delivery, a failure protocol, or a combination thereof.

5. The method of claim 4, wherein the failure protocol includes destroying goods, alerting the user, alerting law enforcement, alerting security guards, traveling to a human operated vehicle, returning to base, or a combination thereof.

6. The method of claim 1, wherein the selected self-driving transportation vehicle is selected from a group consisting of an unmanned vehicle and a drone.

7. The method of claim 6, wherein the particular user device is the landing pad, and wherein determining the selected self-driving transportation vehicle includes determining a distance from a warehouse of the transportation provider to a delivery location indicated by the purchase information, comparing the distance to a threshold value, determining whether the drone is compatible with the landing pad based on the information regarding the particular user device, determining whether a shipment corresponding to the one or more goods or services satisfies weight and size criteria associated with the drone, or a combination thereof.

8. The method of claim 7, wherein determining the selected transportation vehicle includes determining the selected self-driving transportation vehicle to correspond to the drone when the distance is less than the threshold value, when the drone is compatible with the landing pad, and when the shipment satisfies the weight and size criteria.

9. An apparatus, comprising:
a memory; and
a processor coupled to the memory and configured to:
receive a device identification (ID) of a particular user device of one or more user devices of a user and purchase information regarding a purchase, by the user via the particular user device, of one or more goods or services to be provided to the user using the automated transportation service;
send the device ID of the particular user device to a central server;
send information regarding the particular user device;
determine a selected self-driving transportation vehicle based on the purchase information and the information regarding the particular user device;
send a vehicle ID of the selected self-driving transportation vehicle to the central server;
control the selected self-driving transportation vehicle, by sending instructions to the selected self-driving transportation vehicle, to navigate to a general location of the particular user device according to global positioning system signals until the selected self-driving transportation vehicle detects a near field communication signal of the particular user device;
control the selected self-driving transportation vehicle, by sending instructions to the selected self-driving transportation vehicle, performing, via near field communication, a handshake procedure between the selected self-driving transportation vehicle and the particular user device to authenticate each other via the device ID and the vehicle ID; and
upon determining a successful completion of the handshake procedure, control the selected self-driving transportation vehicle, by sending instructions to the selected self-driving transportation vehicle, to navigate to a landing pad of the particular user device according to the near field communication after having navigated to the general location of the particular user device according to global positioning system signals.

10. The apparatus of claim 9, wherein the processor is further configured to send a tracking number associated with the transportation service to the central server from the device of the transportation provider, and wherein providing the transportation service to the user includes the selected self-driving transportation vehicle interacting with the particular user device to verify the particular user device using the tracking number.

11. The apparatus of claim 10, wherein the processor is further configured to receive a security level that is associated with the transportation device, and wherein the transportation service is provided to the user according to the security level.

12. The apparatus of claim 11, wherein the security level indicates a protocol selected from a group consisting of a near field communication (NFC) handshake between the selected self-driving transportation vehicle and the particular user device using the vehicle ID and the tracking number, a video confirmation of delivery, a failure protocol, or a combination thereof.

13. The apparatus of claim 12, wherein the failure protocol includes destroying goods, alerting the user, alerting law enforcement, alerting security guards, traveling to a human operated vehicle, returning to base, or a combination thereof.

14. The apparatus of claim 9, wherein the selected transportation vehicle is selected from a group consisting of an unmanned vehicle, a taxi, and a drone, wherein the particular user device is the landing pad, and wherein determining the selected self-driving transportation vehicle includes determining a distance from a warehouse of the transportation provider to a delivery location indicated by the purchase information, comparing the distance to a threshold value, determining whether the drone is compatible with the landing pad based on the information regarding the particular user device, determining whether a shipment corresponding to the one or more goods or services satisfies weight and size criteria associated with the drone, or a combination thereof.

15. The apparatus of claim 14, wherein determining the selected self-driving transportation vehicle includes determining the selected self-driving transportation vehicle to correspond to the drone when the distance is less than the threshold value, when the drone is compatible with the landing pad, and when the shipment satisfies the weight and size criteria.

16. A computer program product, the computer program product comprising a non-transitory computer readable storage medium having program instructions embodied therewith, the program instructions executable by at least one processor to cause the at least one processor to:
    receive a device identification (ID) of a particular user device of one or more user devices of a user and purchase information regarding a purchase, by the user via the particular user device, of one or more goods or services to be provided to the user using the automated transportation service;
    send the device ID of the particular user device to a central server;
    send information regarding the particular user device;
    determine a selected self-driving transportation vehicle based on the purchase information and the information regarding the particular user device;
    send a vehicle ID of the selected self-driving transportation vehicle to the central server;
    control the selected self-driving transportation vehicle, by sending instructions to the selected self-driving transportation vehicle, to navigate to a general location of the particular user device according to global positioning system signals until the selected self-driving transportation vehicle detects a near field communication signal of the particular user device;
    control the selected self-driving transportation vehicle, by sending instructions to the selected self-driving transportation vehicle, performing, via near field communication, a handshake procedure between the selected self-driving transportation vehicle and the particular user device to authenticate each other via the device ID and the vehicle ID; and
    upon determining a successful completion of the handshake procedure, control the selected self-driving transportation vehicle, by sending instructions to the selected self-driving transportation vehicle, to navigate to a landing pad of the particular user device according to the near field communication after having navigated to the general location of the particular user device according to global positioning system signals.

17. The computer program product of claim 16, wherein the processor is further caused to:
    send a tracking number associated with the transportation service to the central server from the device of the transportation provider, wherein providing the transportation service to the user includes the selected self-driving transportation vehicle interacting with the particular user device to verify the particular user device using the tracking number; and
    receive a security level that is associated with the transportation device, wherein the transportation service is provided to the user according to the security level, and wherein the security level indicates a protocol selected from a group consisting of a near field communication (NFC) handshake between the selected self-driving transportation vehicle and the particular user device using the vehicle ID and the tracking number, a video confirmation of delivery, a failure protocol, or a combination thereof.

18. The computer program product of claim 17, wherein the failure protocol includes destroying goods, alerting the user, alerting law enforcement, alerting security guards, traveling to a human operated vehicle, returning to base, or a combination thereof.

19. The computer program product of claim 16, wherein the selected self-driving transportation vehicle is selected from a group consisting of an unmanned vehicle, a taxi, and a drone, wherein the particular user device is the landing pad, and wherein determining the selected self-driving transportation vehicle includes determining a distance from a warehouse of the transportation provider to a delivery location indicated by the purchase information, comparing the distance to a threshold value, determining whether the drone is compatible with the landing pad based on the information regarding the particular user device, determining whether a shipment corresponding to the one or more goods or services satisfies weight and size criteria associated with the drone, or a combination thereof.

20. The computer program product of claim 19, wherein determining the selected self-driving transportation vehicle includes determining the selected self-driving transportation vehicle to correspond to the drone when the distance is less than the threshold value, when the drone is compatible with the landing pad, and when the shipment satisfies the weight and size criteria.

* * * * *